United States Patent [19]

Crane

[11] Patent Number: 4,909,109
[45] Date of Patent: Mar. 20, 1990

[54] SHEAR ASSEMBLY FOR SHEARING SHEET METAL

[75] Inventor: Earl J. Crane, Independence, Mo.

[73] Assignee: Butler Manufacturing Company, Kansas City, Mo.

[21] Appl. No.: 182,089

[22] Filed: Apr. 15, 1988

[51] Int. Cl.⁴ .......................... B23D 31/00; B26D 1/03
[52] U.S. Cl. ........................................ 83/156; 83/105;
83/407; 83/425; 83/431; 83/437; 83/440.1;
83/694; 83/857
[58] Field of Search ................. 83/857, 856, 415, 425,
83/407, 156, 694, 437, 679, 440, 440.1, 431,
404.3, 102, 105, 13, 56, 425.1, 425.2, 425.3, 858,
605

[56] References Cited

U.S. PATENT DOCUMENTS

| | | | |
|---|---|---|---|
| 2,355,320 | 8/1944 | Nebel | 83/605 X |
| 2,706,001 | 4/1955 | Wilder | 83/105 |
| 3,731,577 | 5/1973 | Swint, Jr. | 83/694 |
| 4,151,772 | 5/1979 | Johnson | 83/418 |
| 4,476,760 | 10/1984 | Block et al. | 83/694 |

Primary Examiner—Frank T. Yost
Assistant Examiner—Rinaldi Rada
Attorney, Agent, or Firm—Kokjer, Bircher, Bradley, Wharton, Bowman & Johnson

[57] ABSTRACT

A sheet metal shear assembly including a pair of shear elements supported at a fixed angle relative to one another to define a shear nip point. The shear elements are supported by jaw-like support members having outer ends which are spaced from one another to define an open entrance through which, by relative movement of the shear assembly and a steel sheet or a strip from a coil, the sheet or strip can be advanced edgewise toward and brought into shearing contact with and move past the shear elements to effect a continuous shearing of the sheet or strip.

7 Claims, 1 Drawing Sheet

U.S. Patent  Mar. 20, 1990  4,909,109
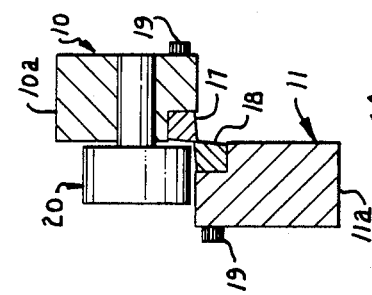
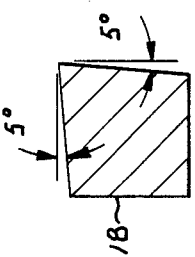
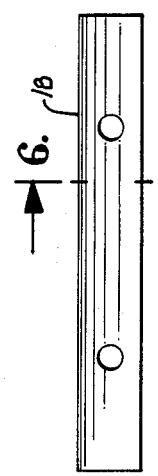
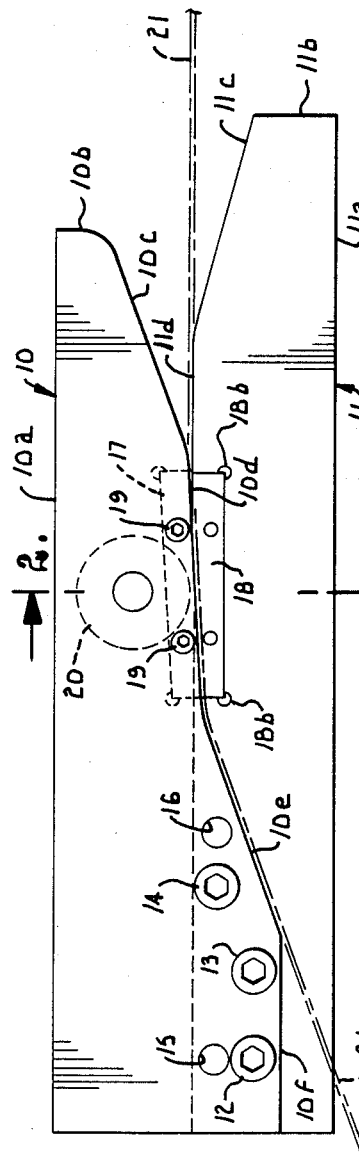
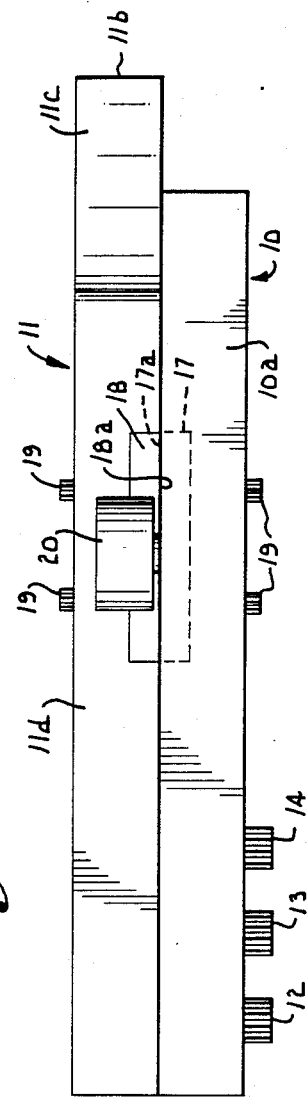
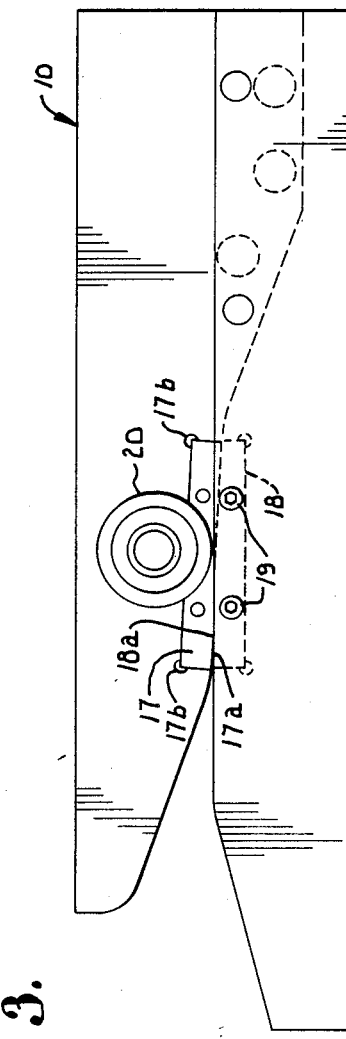

SHEAR ASSEMBLY FOR SHEARING SHEET METAL

FIELD OF THE INVENTION

This invention relates generally to metal working, and deals more particularly with apparatus for shearing sheet metal.

BACKGROUND OF THE INVENTION

The shearing, or slitting, of sheet metal has been accomplished in the past in several different ways.

One primary way involves the use of a set of long blades set at a desired shear angle and driven vertically through the material. Shears of this type require large, heavy frames related to one another by precision connections and expensive bearings. Another problem is that it is difficult to set and maintain the proper blade clearance. In addition, the long shear blades are costly to make and regrinding them is an expensive and time consuming process.

Another common apparatus utilizes roller shears which employ round rotary blades supported on arbors. As the material is fed through, the blades shear the material. As in the case of the long blade shears, the support framing, housings, bearings and arbors are difficult to manufacture, expensive, heavy and the equipment as a whole is inconvenient to move from place to place. The rotary blades require precision sharpening and there are severe problems in maintaining appropriate blade clearance so as to achieve precise shearing.

Shearing has also been done manually with hand tools such as scissors, hand shears and reciprocating shears. These devices do not, however, lend themselves to obtaining accuracy or to an acceptable rate of production. In addition, their use is obviously labor intensive.

SUMMARY OF THE INVENTION

The present invention achieves as its primary object the elimination of substantially all of the problems set forth above for known state-of-the-art metal shearing tooling. With the present invention, I have provided a relatively simple, lightweight shearing apparatus which can be used to shear sheet metal presented in the form of sheets or as drawn from coils of material on a continuous basis. It is highly efficient, requiring little power, due to the low resistance imposed during shearing, and can be produced at a very low cost as compared with the known production line type equipment.

To summarize, the present invention comprises generally a pair of jaws that define a shear zone through which sheet metal moves relative to the jaws. The equipment is designed either for presentation of the jaws as a stationary fixture through which the metal is drawn or alternatively, the shear assembly can be driven through the sheet material. The jaws hold tool steel shearing elements having intersecting cutting edges which are locked at an appropriate shear angle. The elements are much, much smaller than the shortest long blades of conventional blade shears and are much less expensive, both as original equipment and replacement parts, than the conventional long blades, and of course, the rotary blades of the roller shears.

In addition, the arrangement is such in the present invention that the shear elements can easily be removed and replaced to meet differing requirements. The elements in each set of shear elements can also be interchanged with each other to obtain overall increased life for the elements, thus enhancing a reduction in costs of production.

Other and further objects of the invention, together with the features of novelty appurtenant thereto, will appear during the course of the following description.

DETAILED DESCRIPTION OF THE INVENTION

In the accompanying drawings, which form a part of the specification and are to be read in conjunction therewith, and in which like reference numerals indicate like parts in the various views;

FIG. 1 is a side elevational view of a shear assembly constructed in accordance with the preferred embodiment of my invention;

FIG. 2 is a sectional view taken along line 2—2 of FIG. 1 in the direction of the arrows;

FIG. 3 is a top plan view of the assembly of FIG. 1;

FIG. 4 is a side elevational view of the side of the assembly opposite from that shown in FIG. 1;

FIG. 5 is a side elevational view, on an enlarged scale, of a shear element; and FIG. 6 is a sectional view of same taken along line 6—6 of FIG. 5 in the direction of the arrows.

Referring to the drawings, the assembly includes two cooperating jaw members 10 and 11 which are disposed and partially overlapping side-by-side relationship with the jaw 10 generally elevated with respect to jaw 11.

The upper jaw 10 has a flat horizontal top surface 10a and parallel opposed vertical side walls. The bottom surface, starting from the forward end 10b of the jaw, continues with a downwardly inclined portion 10b to a straight portion 10d which leads to another downwardly inclined guide surface 10e terminating in a horizontal straight portion 10f to the rear end of the jaw.

The lower jaw 11 has a flat horizontal bottom surface 11a and vertical side walls. The top surface, which commences at the forward end 11b, has the upwardly inclined portion 11c which leads into a straight horizontal portion 11d which adjoins the forward portion 10c of the upper jaw and continues to the rear of the lower jaw.

Both jaws 10 and 11 are fabricated of good quality steel or the like.

The jaws 10 and 11 are connected and locked together in side-by-side overlapping relationship by Allen bolts 12, 13 and 14 which are received in appropriately bored and tapped openings formed in the jaws which register respectively with one another to receive the bolts. In addition, the jaws are provided with supplemental bores therethrough parallel with the bolts. These receive dowel pins 15 and 16 for locking the shear assembly firmly together. Assembly then can be mounted by conventional holdown means (not shown) to a stationary or movable support as desired, depending on whether during operation the material undergoing shearing is moving or the shear assembly is moving relative to the material.

The shearing edges are provided by a pair of cooperating shear elements 17 and 18 secured and held to respectively by the jaws 10, 11 in a location which will be referred to as the shear nip zone of the assembly. The shear elements are identical with one another. Each comprises a length of tool steel (preferably D2, high chrome tool steel) shaped as a bar having a generally square (but not precisely) cross section. The upper element 17 is received in a lengthwise recess 10g adjacent the inner bottom edge of edge portion 10d of jaw 10. The recess is open on the top and one side and of corresponding shape and dimensions with the shear element.

The element 18 is received in a similar recess 11d formed in jaw 11. The recess is located adjacent recess 10g being formed at the inner edge of the forward end of the top surface 11d of jaw 11. Recess 11d is of corresponding shape and dimensions with the lower shearing element 18. The inner horizontal corners of both recesses are relieved by drill holes 17b, 18b, respectively, to facilitate insertion of the shearing elements.

The shearing elements are respectively secured in position in the respective recesses, each by a pair of Allen bolts 19 which extend through appropriate holes in the jaws and the ends of which are received in tapped openings in the shearing elements. Adjustments in clearance can be made by adding or withdrawing shim elements (not shown) between the elements and face of the recess.

The bottom surface portion 10d of jaw 10 is canted slightly upwardly (approximately 3°) with respect to top surface 11d of jaw 11 and the recesses are similarly canted with respect to one another so that the cutting edges 17a, 18a respectively of the shear elements are separated from one another at the upstream end and converge toward one another to intersect intermediate their ends at the point through which line 2—2 of FIG. 1 is drawn. Downstream of this point the confronting inside faces of the elements are closely overlapping. The shear elements thus define a shear nip which presents converging cutting edges which cooperate to shear metal sheet material in response to relative movement of the metal sheet and the shear assembly toward one another.

A hold down roller 20 is mounted adjacent the inside face of the upper jaw 10 for rotation about a horizontal axis. The roller is positioned to provide a feed passage between its lowermost point and the top surface of shear element 18 sufficient to receive the thickest of the material to be handled by the apparatus.

As has earlier been noted, the cross sectional shape of the shearing elements is not precisely square. Referring particularly to FIGS. 2 and 6, it will be noted that the faces of the shear elements which intersect at the edge 17a or 18a, are relieved inwardly. The preferred angle of relief is approximately 5°. I have found that this, as compared to an edge defined at faces positioned at 90° with respect to one another provides much cleaner cutting with less resistance to the shearing action.

In operation, in referring again to FIG. 1 for purposes of illustration, a sheet in the process of being sheared is illustrated by the broken lines 21. Shearing takes place at the nip point earlier described. The severed portion downstream of the nip point and below jaw member 10 is deflected downwardly, while on the other side, the other severed portion of the sheet moves rearwardly on top surface 11d of jaw member 11. Shearing can be accomplished either by pulling the material through the shear assembly or the stock material may be fixed and the shearing assembly pushed through the stock material. Obviously, the invention is particularly suitable to shearing lengthy sheets or strips unwound from coils in continuous lines.

The shearing elements may be switched from one jaw member to another so as to obtain an extended life of use before replacement. All this requires is backing out of the bolts 19 and removal and switching places forth shear elements. This will permit fresh cutting edges leading to and at the shear nip.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

I claim:

1. In combination, a shear assembly for shearing metal sheet comprising
   a pair of jaw members positioned relative to one another at a fixed angle to define a shear nip zone and having spaced outer ends which define an open entrance to said zone for edgewise insertion of a metal sheet toward said nip zone,
   a pair of cooperating shear elements,
   means securing one of said elements to each of said jaws, said shear elements having cooperating cutting edges converging to an intersection in said nip zone and defining a shear nip point,
   said nip point operating to shear said sheet in response to continued relative movement of said sheet into said entrance and past said nip point.

2. The combination as in claim 1,
   one of said jaws and shear elements defining a horizontal support surface adjacent and on one side of said nip point for supporting said sheet from beneath during its movement past the nip point.

3. The combination as in claim 2, including
   a roller supported above said support surface and defining with said surface a guide passage for maintaining said sheet in proper shearing relationship with said shear elements during said movement.

4. The combination as in claim 1, said shear elements being rectilinear in cross section, the cutting edge of each element being formed by two intersecting faces, one of said faces generally parallel to the sheet and the other of said faces transverse to the sheet, those faces transverse to the sheet being inclined from the vertical away from the cutting edge.

5. The combination as in claim 1, each of said jaw members including a recess therein adjacent said nip zone,
   each said recess configured to receive and support one of said shear elements.

6. The combination as in claim 1,
   said jaw members having parallel vertical said faces and arranged in partially overlapping relationship with the overlapping portions located relative to said nip zone in the direction opposite from said entrance, and
   means connecting said overlapping portions together to lock the relationship of said jaws to one another.

7. The combination as in claim 3,
   said jaw members including an upper jaw member and a lower jaw member,
   said roller connected to and suproted on said upper jaw member.

* * * * *